(12) United States Patent
Sonwane et al.

(10) Patent No.: US 8,984,620 B2
(45) Date of Patent: Mar. 17, 2015

(54) IDENTITY AND POLICY-BASED NETWORK SECURITY AND MANAGEMENT SYSTEM AND METHOD

(75) Inventors: Abhilash Vijay Sonwane, Ahmedabad (IN); Jimit Hareshkumau Mahadevia, Ahmedabad (IN); Sarfaraz Mohammedhanif Malek, Ahmedabad (IN); Sumit Pandya, Gujarat (IN); Nishit Shantibhai Shah, Ahmedabad (IN); Rajesh Hardasbhai Modhwadiya, Gujarat (IN)

(73) Assignee: Cyberoam Technologies Pvt. Ltd., Gujarat (IN)

( * ) Notice: Subject to any disclaimer, the term of this patent is extended or adjusted under 35 U.S.C. 154(b) by 293 days.

(21) Appl. No.: 11/915,607

(22) PCT Filed: Aug. 21, 2007

(86) PCT No.: PCT/IN2007/000359
§ 371 (c)(1),
(2), (4) Date: Nov. 27, 2007

(87) PCT Pub. No.: WO2009/007985
PCT Pub. Date: Jan. 15, 2009

(65) Prior Publication Data
US 2010/0100949 A1    Apr. 22, 2010

(30) Foreign Application Priority Data
Jul. 6, 2007  (IN) .......................... 1299/MUM/2007

(51) Int. Cl.
H04L 29/06      (2006.01)
H04L 29/12      (2006.01)

(52) U.S. Cl.
CPC .......... *H04L 63/102* (2013.01); *H04L 29/12339* (2013.01); *H04L 61/2503* (2013.01); *H04L 63/0254* (2013.01); *H04L 63/0263* (2013.01); *H04L 63/1408* (2013.01); *H04L 63/20* (2013.01)
USPC ...................................... 726/13; 726/1; 726/7

(58) Field of Classification Search
CPC ...................... H04L 29/12339; H04L 61/2503; H04L 63/0254; H04L 63/20; H04L 63/102; H04L 63/1408; H04L 63/0263
USPC .................................................... 726/1, 7, 13
See application file for complete search history.

(56) References Cited

U.S. PATENT DOCUMENTS

| | | | |
|---|---|---|---|
| 5,050,161 A * | 9/1991 | Golestani ...................... 370/230 |
| 5,983,270 A * | 11/1999 | Abraham et al. ............ 709/224 |
| 5,983,350 A | 11/1999 | Minear et al. |
| 6,230,271 B1 * | 5/2001 | Wadlow et al. ................... 726/1 |
| 6,330,590 B1 | 12/2001 | Cotten |
| 6,356,529 B1 * | 3/2002 | Zarom ......................... 370/231 |
| 6,463,474 B1 * | 10/2002 | Fuh et al. ...................... 709/225 |
| 6,496,935 B1 * | 12/2002 | Fink et al. ...................... 726/13 |
| 6,502,131 B1 * | 12/2002 | Vaid et al. ..................... 709/224 |
| 6,587,466 B1 * | 7/2003 | Bhattacharya et al. .. 370/395.21 |

(Continued)

*Primary Examiner* — David García Cervetti
(74) *Attorney, Agent, or Firm* — Lowenstein Sandler LLP (57) ABSTRACT

A system and method for providing security for a network connecting a source and a destination. The system and method provide a security and management system between the source and the destination which is configured to apply rules and policies which are specific to the user to the connection between the source and the destination. The user-specific policies are used to govern the security and management of each packet transmitted and received via the connection.

24 Claims, 5 Drawing Sheets

(56) References Cited

U.S. PATENT DOCUMENTS

| | | | |
|---|---|---|---|
| 6,609,154 B1* | 8/2003 | Fuh et al. | 709/225 |
| 6,615,358 B1* | 9/2003 | Dowd et al. | 726/14 |
| 6,678,828 B1* | 1/2004 | Pham et al. | 726/2 |
| 6,678,835 B1* | 1/2004 | Shah et al. | 714/4.12 |
| 6,738,377 B1* | 5/2004 | Boden | 370/392 |
| 6,832,248 B1* | 12/2004 | Byrnes | 709/223 |
| 6,895,511 B1* | 5/2005 | Borsato et al. | 726/5 |
| 6,931,530 B2* | 8/2005 | Pham et al. | 713/165 |
| 6,944,183 B1* | 9/2005 | Iyer et al. | 370/466 |
| 7,010,807 B1 | 3/2006 | Yanovsky | |
| 7,032,022 B1* | 4/2006 | Shanumgam et al. | 709/225 |
| 7,080,077 B2* | 7/2006 | Ramamurthy et al. | 707/754 |
| 7,089,586 B2* | 8/2006 | Kilgore | 726/13 |
| 7,143,151 B1* | 11/2006 | Kayashima et al. | 709/223 |
| 7,143,288 B2* | 11/2006 | Pham et al. | 713/165 |
| 7,272,625 B1* | 9/2007 | Hannel et al. | 709/200 |
| 7,293,175 B2* | 11/2007 | Brown et al. | 713/166 |
| 7,333,430 B2* | 2/2008 | Li et al. | 370/230 |
| 7,366,812 B2* | 4/2008 | Lambourn et al. | 710/240 |
| 7,389,533 B2* | 6/2008 | Bartlett et al. | 726/15 |
| 7,398,552 B2* | 7/2008 | Pardee et al. | 726/15 |
| 7,461,401 B2* | 12/2008 | Leppanen et al. | 726/11 |
| 7,480,707 B2* | 1/2009 | Morlitz | 709/223 |
| 7,506,054 B1* | 3/2009 | Fuh et al. | 709/225 |
| 7,565,532 B2* | 7/2009 | Pham et al. | 713/165 |
| 7,610,330 B1* | 10/2009 | Quinn et al. | 709/201 |
| 7,624,424 B2* | 11/2009 | Morita et al. | 726/1 |
| 7,630,338 B2* | 12/2009 | Vesterinen et al. | 370/329 |
| 7,643,416 B2* | 1/2010 | Pardee et al. | 370/231 |
| 7,735,129 B2* | 6/2010 | Nagata et al. | 726/15 |
| 7,768,920 B2* | 8/2010 | Goshen et al. | 370/235 |
| 7,769,851 B1* | 8/2010 | Guruswamy et al. | 709/224 |
| 7,783,666 B1* | 8/2010 | Zhuge et al. | 707/783 |
| 7,809,826 B1* | 10/2010 | Guruswamy | 709/224 |
| 7,810,151 B1* | 10/2010 | Guruswamy | 726/13 |
| 7,823,185 B1* | 10/2010 | Seaman et al. | 726/1 |
| 7,849,497 B1* | 12/2010 | Hurst et al. | 726/1 |
| 7,881,215 B1* | 2/2011 | Daigle et al. | 370/252 |
| 7,904,941 B2* | 3/2011 | Jagadeesan et al. | 726/1 |
| 7,937,755 B1* | 5/2011 | Guruswamy | 726/22 |
| 7,948,952 B2* | 5/2011 | Hurtta et al. | 370/338 |
| 7,966,654 B2* | 6/2011 | Crawford | 726/11 |
| 7,996,912 B2* | 8/2011 | Spalink et al. | 726/26 |
| 8,046,578 B1* | 10/2011 | Trudeau et al. | 713/154 |
| 8,069,244 B2* | 11/2011 | Wiryaman et al. | 709/225 |
| 8,176,561 B1* | 5/2012 | Hurst et al. | 726/25 |
| 8,234,702 B2* | 7/2012 | Maes | 726/13 |
| 8,341,723 B2* | 12/2012 | Abzarian et al. | 726/13 |
| 8,355,413 B2* | 1/2013 | Vasamsetti et al. | 370/468 |
| 8,584,199 B1* | 11/2013 | Chen et al. | 726/1 |
| 2002/0065835 A1* | 5/2002 | Fujisaki | 707/200 |
| 2002/0116545 A1* | 8/2002 | Mandato et al. | 709/328 |
| 2002/0147733 A1* | 10/2002 | Gold et al. | 707/200 |
| 2003/0005331 A1* | 1/2003 | Williams | 713/201 |
| 2003/0074563 A1* | 4/2003 | Spacey | 713/181 |
| 2003/0110379 A1* | 6/2003 | Ylonen et al. | 713/164 |
| 2004/0001475 A1* | 1/2004 | Mikkonen | 370/351 |
| 2004/0078568 A1* | 4/2004 | Pham et al. | 713/165 |
| 2004/0098620 A1* | 5/2004 | Shay | 713/201 |
| 2004/0107342 A1* | 6/2004 | Pham et al. | 713/165 |
| 2004/0123153 A1 | 6/2004 | Wright et al. | |
| 2004/0162901 A1* | 8/2004 | Mangipudi et al. | 709/225 |
| 2004/0234056 A1* | 11/2004 | Heilmann et al. | 379/196 |
| 2005/0027980 A1* | 2/2005 | Peled et al. | 713/164 |
| 2005/0044138 A1 | 2/2005 | Albert et al. | |
| 2005/0138162 A1* | 6/2005 | Byrnes | 709/223 |
| 2005/0138204 A1* | 6/2005 | Iyer et al. | 709/242 |
| 2005/0188197 A1* | 8/2005 | Bordes et al. | 713/160 |
| 2005/0226250 A1* | 10/2005 | Makayama et al. | 370/395.21 |
| 2005/0229237 A1* | 10/2005 | Xie et al. | 726/1 |
| 2005/0283823 A1 | 12/2005 | Okajo et al. | |
| 2006/0059551 A1* | 3/2006 | Borella | 726/13 |
| 2006/0104233 A1* | 5/2006 | Zhang | 370/328 |
| 2006/0104284 A1* | 5/2006 | Chen | 370/395.3 |
| 2006/0174337 A1* | 8/2006 | Bernoth | 726/11 |
| 2006/0239254 A1* | 10/2006 | Short et al. | 370/352 |
| 2006/0250968 A1* | 11/2006 | Hudis et al. | 370/241 |
| 2006/0272013 A1* | 11/2006 | Kilgore | 726/11 |
| 2007/0008971 A1* | 1/2007 | Li et al. | 370/392 |
| 2007/0016937 A1* | 1/2007 | Bassett et al. | 726/1 |
| 2007/0016945 A1* | 1/2007 | Bassett et al. | 726/11 |
| 2007/0044144 A1* | 2/2007 | Knouse et al. | 726/8 |
| 2007/0168499 A1* | 7/2007 | Chu | 709/224 |
| 2007/0174905 A1* | 7/2007 | Martherus et al. | 726/8 |
| 2007/0195788 A1* | 8/2007 | Vasamsetti et al. | 370/395.21 |
| 2007/0204326 A1* | 8/2007 | Bocking et al. | 726/1 |
| 2007/0239987 A1* | 10/2007 | Hoole et al. | 713/169 |
| 2007/0294755 A1* | 12/2007 | Dadhia et al. | 726/11 |
| 2008/0028436 A1* | 1/2008 | Hannel et al. | 726/1 |
| 2008/0028445 A1* | 1/2008 | Dubuc et al. | 726/5 |
| 2008/0086473 A1* | 4/2008 | Searl et al. | 707/9 |
| 2008/0115190 A1* | 5/2008 | Aaron | 726/1 |
| 2008/0134308 A1* | 6/2008 | Yalakanti et al. | 726/6 |
| 2008/0148381 A1* | 6/2008 | Aaron | 726/11 |
| 2008/0222532 A1* | 9/2008 | Mester et al. | 715/738 |
| 2008/0229381 A1* | 9/2008 | Sikka et al. | 726/1 |
| 2008/0282336 A1* | 11/2008 | Diaz Cuellar et al. | 726/11 |
| 2009/0006847 A1* | 1/2009 | Abzarian et al. | 713/164 |
| 2009/0106433 A1* | 4/2009 | Knouse et al. | 709/229 |
| 2009/0138968 A1* | 5/2009 | Serber | 726/22 |
| 2010/0284327 A1* | 11/2010 | Miklos | 370/328 |

* cited by examiner

IDENTITY AND POLICY-BASED NETWORK SECURITY AND MANAGEMENT SYSTEM AND METHOD

CROSS REFERENCE TO RELATED APPLICATIONS

This application is a U.S. National Stage Application of PCT International Application No. PCT/IN2007/00359, titled "Identity and Policy-Based Network Security System and Method", filed Aug. 21, 2007, which in turn claims the benefit of Indian Patent Application Number 1299/Mum/2007, filed Jul. 6, 2007. PCT International Application No. PCT/IN2007/00359 and Indian Patent Application Number 1299/Mum/2007 are hereby incorporated herein by reference.

FIELD OF THE INVENTION

The present invention relates generally to a method and system for managing a network connection, and specifically for conducting an identity-based and policy/rules-based analysis of one or more packets sent over a connection in the network to provide increased security and optimize computing resources.

BACKGROUND OF THE INVENTION

In conventional network environments, firewalls have played an increasingly important role in protecting resources residing on a private network, while allowing communication with and access to systems located on an unprotected network, such as, for example, the Internet. The firewall acts as a gatekeeper, configured to prevent attacks on a private network deriving from the unprotected network by providing a single connection with limited services.

In this regard, the firewall is able to secure a private network by allowing the network administrator to develop and implement a particular security policy. Some conventional firewalls are configured to implement access rules which are based on the association of the source IP address and the destination IP address. While this approach is effective for a static network environment, it is not effective for systems including conventional dynamic addressing, such as, for example, a Dynamic Host Configuration Protocol (DHCP) or a wi-fi network environment. In a typical dynamic IP environment, the user's information is not available on the LAN side, and, as such, no user-specific rules or decisions can be implemented.

Network Address Translation (NAT) firewalls have been developed to provide for the mapping of port numbers to allow multiple machines to share a single IP address. NAT is also used to provide mapping of private and public IP addresses. One can not have a pool of public IP addresses to be used for NAT whereby a single user or a group of users can be NATed by a specific IP address so as to identify themselves uniquely to an external server.

Furthermore, a conventional firewall is not able to identify a user. Even those firewalls which are adapted to include an authentication of the user are limited in that they are unable to apply user-specific rules to perform NATing. According to these systems, the user's identity is not part of the rule matching criteria considered by the firewall.

Accordingly, there is a need in the art for a method and system for a more robust network security system capable of considering a user's identity as part of the firewall rule matching criteria.

SUMMARY OF THE INVENTION

The above-described problems are addressed and a technical solution is achieved in the art by a system and a method for managing and securing a network. According to an embodiment of the present invention, the network security system and method comprise a firewall wherein the user's identity and user-specific policies are combined to provide enhanced network security and resource optimization.

According to an embodiment of the present invention, a method and system is provided for managing a network connection between a source and a destination for the transmission of at least one data packet. According to the present invention, a login request comprising a user IP address, and login credentials is received from a user. Based on the login credentials, the user is authenticated. Following authentication, a profile associated with the authenticated user is identified. The profile is specific to the user and comprises user data and one or more user-specific security and management policies.

According to an embodiment of the present invention, the system determines if the user is authorized to login. To determine whether the login request is authorized, the system applies the at least one user-specific policy of the identified profile. For example, to determine if the login request is authorized, the system may apply an access time policy and/or quota policy. If the login request is in compliance with the at least one user-specific policy, then the login request is authorized.

Next, a record including identity information related to the authorized user is created and stored, wherein the identity information comprises the profile and the user IP address. The identity information creates an association between the user and the one or more user IP addresses associated with that user.

The system is configured to receive a data communication from a source intended for a destination. The data communication includes one or more data packet, with each packet comprising a source IP address and a destination IP address. The system is configured to identify and apply the user-specific policy associated with the user.

According to an embodiment of the present invention, the system creates a connection object associated with the connection based at least on the source IP address and a destination IP address. The connection object is then associated with the at least one packet.

Based on the source IP address, the system identifies the identity information associated with the authorized user. Next, the connection object is updated with the identified identity information and a connection is established based on the information and policies included in the updated connection object. In this regard, the connection is secured and managed according to the user-specific policy associated with the user.

BRIEF DESCRIPTION OP THE DRAWINGS

The present invention will be more readily understood from the detailed description of preferred embodiments presented below considered in conjunction with the attached drawings, of which:

FIG. 3 illustrates a process flow of an exemplary Network Management System, according to an embodiment of the present invention;

It is to be understood that these figures are for purposes of illustrating the concepts of the invention and may not be to scale.

DETAILED DESCRIPTION OF THE INVENTION

Figure 1:
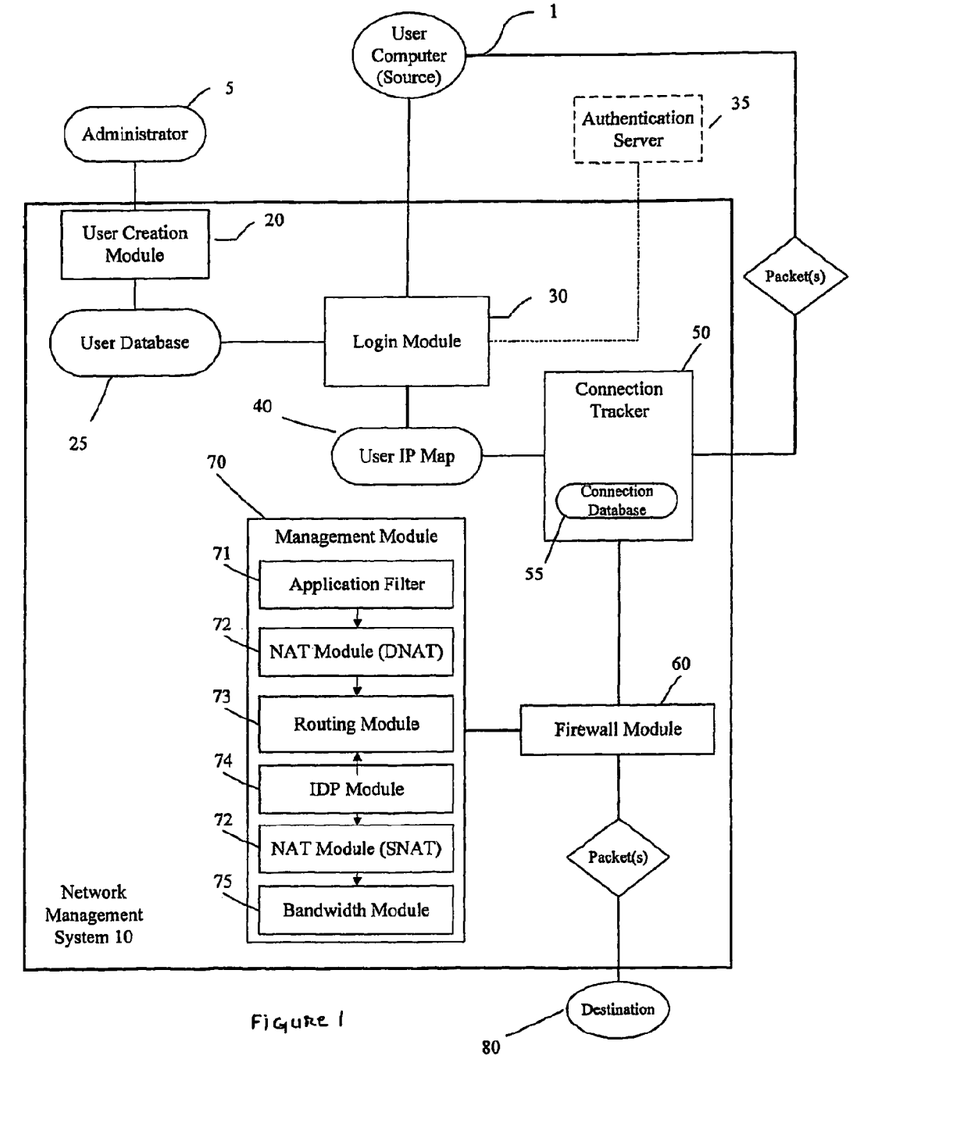
FIG. 1 illustrates an exemplary Network Management System, according to an embodiment of the present invention.

FIG. 1 depicts a Network Management System 10 according to embodiments of the present invention. It is to be understood that the schematic representation of the Network Management System 10 provided in FIG. 1 is exemplary in nature and alternative arrangements are within the scope of the present invention.

According to an embodiment of the present invention, the Network Management System 10 is a computer-based security system, accessible by one or more communicatively connected user computers or "sources" seeking to establish a connection and transmit and/or receive data to and from a computer-based resource, herein referred to as a "destination". The term "computer" is intended to include any data processing device, such as a desktop computer, a laptop computer, a mainframe computer, a personal digital assistant, a server, or any other device able to process data. The term "communicatively connected" is intended to include any type of connection, whether wired or wireless, in which data may be communicated. The term "communicatively connected" is intended to include a connection between devices and/or programs within a single computer or between devices and/or programs on separate computers.

According to an embodiment of the present invention, the Network Management System 10 and related methods described herein comprises a User Creation Module 20, a User Database 25, a Login Module 30, a User IP Map 40, a Connection Tracker 50, a Firewall Module 60, and a Management Module 70, configured to manage and secure the connection between the User Computer 1, or source, and a destination (identified as Destination 80 in FIG. 1), wherein information specific to an identity of the user sending the one or more packets to the Destination 80 is used as part of the network and firewall traversal criteria. Furthermore, the Network Management System 10 is configured to consider and implement a number of additional user-specific policies governing the use and traversal of the connection.

One having ordinary skill in the art will appreciate that the components of the Network Management System 10 may be located on a single computer, as schematically illustrated in FIG. 1, or on more than one communicatively connected computers. The Network Management System 10 and the components thereof perform a number of functions, as described in detail below, which may be executed, implemented, supervised, monitored, and/or managed by a computer (i.e., hardware and/or software), one or more persons, or a combination of both.

A user or source may access the Network Management System 10 using a computer, herein referred to as a User Computer 1. According to an embodiment of the present invention, the User Computer 1 may include, but is not limited to, a Web browser that provides a portal to one or more Web-based networks (e.g., the Internet) or an executable or binary program that provides an interface to the user and is connectable to a remote Authentication Server 35 and/or the Login Module 30. One having ordinary skill in the art will appreciate that any suitable Web browser may be used in accordance with the present invention, including but not limited to FireFox, Microsoft® Internet Explorer, Netscape, Opera, WebTV®, and Mozilla™.

For each user that is permitted to interact with and traverse the Network Management System 10 a "profile" is created and stored, thereby registering the user with the system. According to an embodiment of the present invention, one or more persons responsible for managing, updating, editing, or controlling the Network Management System 10, herein referred to as an Administrator 5, creates the profile for each user using the User Creation Module 20, according to the user creation processes illustrated in FIG. 2.

Figure 2:
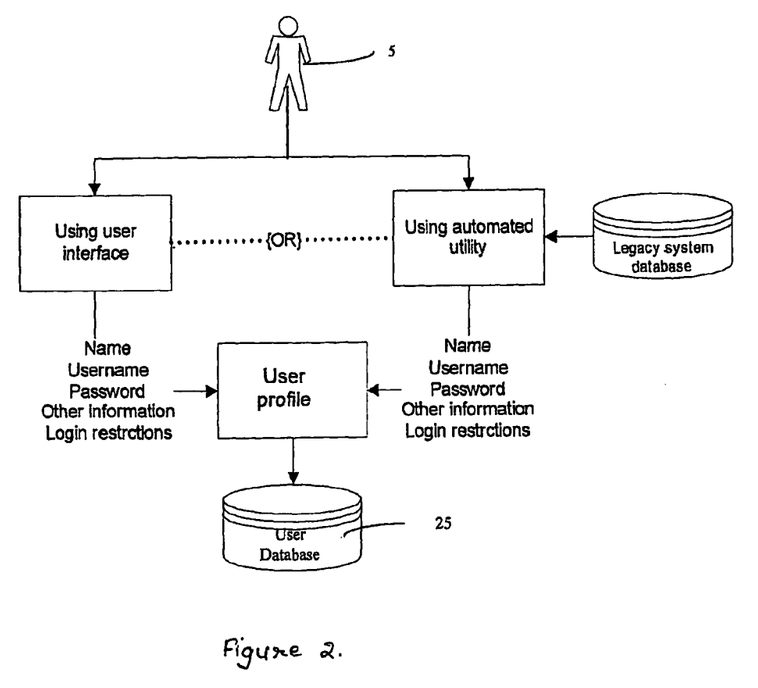
FIG. 2 illustrates an exemplary process flow of the operation of a User Creation Module of a Network Management System, according to an embodiment of the present invention.

As shown in FIG. 2, the Administrator 5 may create the "profile" for the user via an interface to the User Creation Module 20 by entering information that identifies the user, herein referred to as "user data." The user data may comprise any information that is suitable to identify a user, including, but not limited to, the user's name, username, and password. The profile further comprises one or more pre-set rules, policies, limitations, permissions, parameters, authorizations, or restrictions which are specific to the user, herein collectively referred to as a "user-specific policy." The term "user-specific policy" may include any number of policies (e.g., restrictions, rules, permissions, authorizations, limitations, and/or parameters) related to the user's use of the network. The user-specific policy may include, but is not limited to, login restrictions, access time policies/restrictions, group identification information, upload data transfer limits/parameters, download data limits/parameters, an Application Security Policy such as an Internet access Policy, quota policy, access time policy, anti-virus scanning policy, logging policy, bandwidth classes, Intrusion Detection and Prevention (IDP) Policy, route information or policy, upload and download data transfer limits, etc.

As used herein, the term "Application Security Policy" is intended to include, but is not limited to, a rule or policy related to the control of application layer capabilities based on information related to one or more application protocols.

As used herein, the term "Internet access policy" is intended to include, but is not limited to, a rule or policy related to the control of access to a Wide Area Network (WAN) from a Local Area Network (LAN).

As used herein, the term "quota policy" is intended to include, but is not limited to, a rule or policy that governs the amount of time (i.e., the limit or quota) that a user is permitted to access and/or surf the WAN or the Internet.

As used herein, the term "access time policy" is intended to include, but is not limited to, a rule or policy that governs the amount of time and timing of when a user is permitted to access and/or surf the WAN or the Internet.

As used herein, the term "anti-virus scanning policy" is intended to include, but is not limited to, a policy that governs whether the specific traffic should be scanned for a virus or not.

As used herein, the term "routing policy" is intended to include, but is not limited to, a policy that governs the manner in which a packet should be routed.

As used herein, the term "logging policy" is intended to include, but is not limited to, a policy that governs whether a packet, connection and/or relevant policy/rule information should be logged or not.

The profile (or user profile) comprising the user data and the user-specific policy is created and stored in the User Database 25.

According to an embodiment of the present invention, the Administrator 5 may employ an automated utility configured to extract and copy user data from an existing legacy systems or conventional user databases and store such user data in the User Database 25. Exemplary legacy systems and/or user databases from which the automated utility may extract user data include, but are not limited to, a Lightweight Directory Access Protocol (LDAP) server, a Radius server, a Windows Active Directory, and a Windows Domain Controller.

Prior to interacting with the network, the user logs on to the Network Management System 10, as illustrated in FIG. 3. As shown in FIG. 3, the User Computer 1 communicatively connects to the Login Module 30, a computer-based module configured to receive all login requests and authenticate the users, and is prompted to provide login credentials in order to gain access to the Network Management System 10. The login credentials may include any information suitable for identifying the user, including, but not limited to one or more of the following: a username, password, IP address, and hardware address. The logon process may be conducted in accordance with any suitable sign on protocol known in the art, including, but not limited to a HTTP protocol, Single Sign-On (SSO) protocol, or other proprietary protocol.

According to an embodiment of the present invention, the Login Module 30 is configured to authenticate the User Computer 1 by checking the login credentials against the one or more user profiles stored in the User Database 25. In this regard, the Login Module 30 searches the User Database 25 to determine if there is a profile stored therein that includes user data which corresponds to the login credentials presented by the User Computer 1.

Optionally, the Login Module 30 may be communicatively connected to an Authentication Server 35. According to this option, the Login Module 30 is configured to send an authentication request to the Authentication Server 35 for processing, and, in response, the Authentication Server 35 returns an authentication reply indicating whether the user has been authenticated. The Authentication Server 35 is a computer-based module configured to perform authentication services, and may be any suitable authentication means known to those having ordinary skill in the art, such as, for example, an Active Directory, a Windows Domain Controller, a LDAP Server, or a Radius Server. One having ordinary skill in the art will appreciate that the Authentication Server 35 may reside within the Network Management System 10 or may be a separate component accessible by the Network Management System 10, as denoted by the dashed line in FIG. 1.

If the user is not authenticated (i.e., the authentication is not successful), the Login Module 30 sends a message indicating same to the User Computer 1.

If the user is authenticated, the Login Module 30 next determines if the user is authorized to perform the login request by comparing the login credentials with the user-specific policy associated with the particular user's profile stored in the User Database 25. To determine if the login request is authorized, the system may apply the appropriate user-specific policy, such as, for example, the access time policy and/or the quota policy. If the login request is compliant with and conforms to all of the applied user-specific policies, the user is authorized, and the Login Module 30 sends the profile (i.e., the user data and user-specific policy) and the user's IP address to the communicatively connected User IP Map 40. The profile data (i.e., the user data and user-specific policy) and the user's IP address are associated with one another and stored as the user's "identity information" in the User IP Map 40. The identity information comprises the profile data (i.e., the user data and user-specific policy) and the user IP address.

Once the user is authenticated and the associated login request is authorized, the Network Management System 10 may process one or more packets via a connection between a source (User Computer 1) and a Destination 80. As shown in FIGS. 1 and 3, the Network Management System 10 receives a packet from a source and submits the packet to the Connection Tracker 50. One having ordinary skill in the art will appreciate that any suitable input driver may be used to receive the packet, in accordance with the present invention. For illustration purposes, the process flow depicted in FIG. 3 shows a packet as is it processed by the Network Management System 10. As shown in FIG. 3, the packet includes the source IP address, the destination IP address, transport layer information, and may optionally include application layer data.

The Connection Tracker 50, a computer-based module configures to track each connection between a user and a destination, checks each packet received from the source to determine if the packet belongs to an existing connection. To do so, the Connection Tracker 50 checks the communicatively connected Connection Database 55, a database configured to store information related to each connection. According to an embodiment of the present invention, the connection information, herein referred to as a "connection object" includes, but is not limited to a request tuple (i.e., information related to the source and destination available to the source) and a reply tuple (i.e., information related to the source and destination available to the destination), and is stored in the Connection Database 55, preferably when the first packet (i.e., the synchronizing packet) of the connection between the source and destination arrives. Each connection object stored in the Connection Database 55 is represented by an address, herein referred to as the "connection reference."

As each packet enters, the Connection Tracker 50 reviews the source and destination address data, and based on this data, retrieves the associated connection object from the Connection Database 55. If the packet belongs to an existing connection (i.e., there is an existing connection reference and object related to the source address and destination address associated with the packet), the Connection Tracker 50 retrieves the connection object and updates the packet data structure with connection reference associated with the connection object. As such, each connection managed by the Connection Tracker 50 is assigned a unique connection reference which may be added to packets related to that particular connection.

If the packet does not belong to an existing connection, the Connection Tracker 50 creates a connection object (including the request tuple and reply tuple). In addition, the Connection Tracker 50 creates an associated connection reference related to the connection object, and stores the connection reference in the Connection Database 55. As shown in FIG. 3, the packet, as updated with the connection reference, includes, but is not limited to, the source IP address, the destination IP address, the transport layer information and the connection reference.

Next, using the source IP address, the Connection Tracker 50 accesses the communicatively connected User IP Map 40 to look up and identify the appropriate identity information. To do so, the Connection Tracker 50 locates the IP address in the plurality of identity information records that matches the source IP address, and retrieves the associated identity information. As described above, at the time the user is authenticated, the user and source IP address have been associated or mapped to one another in the User IP Map 40. As such, using the source IP address, the Connection Tracker 50 is able to identify the appropriate identity information.

The Connection Tracker 50 then updates the connection object with the portion of the user-specific policy which relates to the connection (e.g., an application security policy, IDP, the upload data transfer limit, and route information/policy). Further, the Connection Tracker 50 updates the packet with the portion of the user-specific policy which relates to the packet (e.g., the bandwidth class information). Accordingly, as the source (e.g., User Computer 1) transmits packets of data to the Destination 80 via the Network Management System 10, each packet is associated with and governed by the particular user's user-specific policy.

The Connection Tracker 50 comprises a zone lookup sub-module is configured to use the inbound interface (interface with the source) and outbound interface (interface with the destination) to determine the appropriate source and destination zones. According to an embodiment of the present invention, the zone lookup sub-module uses the interfaces to zone mapping information provided by the administrator during creation of the user.

Advantageously, the packet and connection may be managed by the user-specific policy comprised within the identity information. In addition, the user identity information may further be used as part of the firewall traversal criteria, as described in detail below with reference to FIG. 4.

Figure 4:
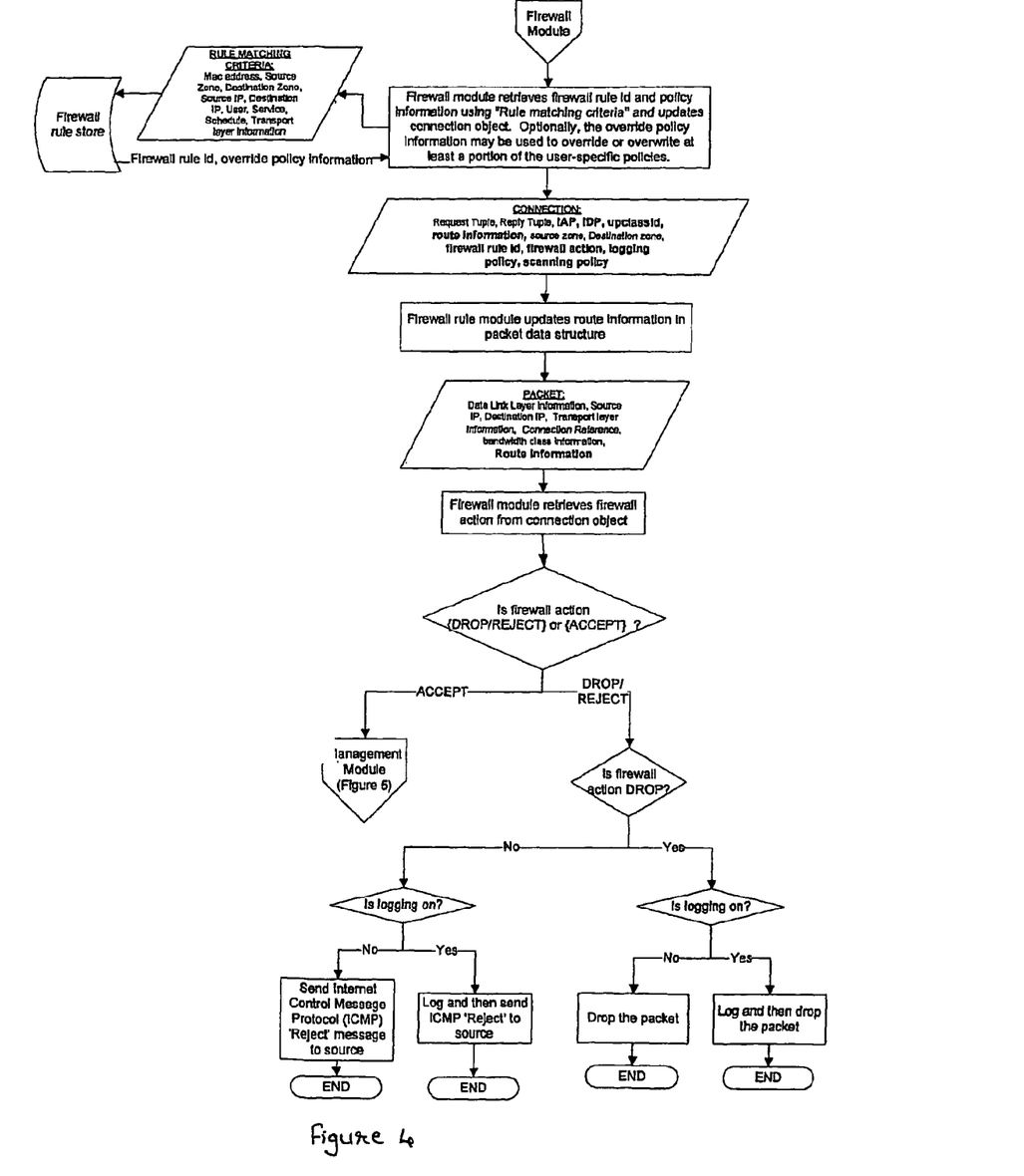
FIG. 4 illustrates an exemplary Firewall Module, according to an embodiment of the present invention.

According to an embodiment of the present invention, the Connection Tracker 50 passes the updated connection object including the request tuple, reply tuple, user-specific policy, and source and destination zone information to the communicatively connected Firewall Module 60.

FIG. 4 illustrates an exemplary process flow of the operation and function of the Firewall Module 60, according to an embodiment of the present invention. First, the Firewall Module 60 retrieves the firewall rule and updates the connection object with the firewall rule information. The firewall rule may include, but is not limited to, the firewall rule identifying information, the related firewall action (e.g., drop/reject or accept), a logging policy, and a scanning policy. According to an embodiment of the present invention, the firewall rules may be stored in a database which is communicatively connected to the Firewall Module 60. Optionally, policy information associated with the firewall rule may be maintained in the firewall store. This policy information is herein referred to as the "override policy information" because it may be used to override or overwrite one or more of the user-specific policies.

The Firewall Module 60 determines the appropriate firewall rule to associate with the connection object by applying the "rule matching criteria," according to any suitable search method known to those having ordinary skill in the art, such as, for example, a sequential searching method. As used herein, the term "rule matching criteria" is intended to include, but is not limited to, the Mac address, the source zone, the destination zone, source IP address, destination IP address, user identity, service data, Transport layer information, and schedule information.

The Firewall Module 60 examines the connection object (and information contained therein) received from the Connection Tracker 50 and applies the rules matching criteria to determine the applicable firewall rule. Next, the Firewall Module 60 updates the connection object with at least a portion of the firewall rule which relates to the connection. As noted above, optionally, the Firewall Module 60 may update the connection object with policy information retrieved from the firewall store, wherein the policy information is applied to override or overwrite one or more of the user-specific policies. In the example shown in FIG. 4, the connection object is updated to include the firewall rule identifying information, the firewall action, the override policy information, the logging policy and the scanning policy.

According to an embodiment of the present invention, the Firewall Module 60 also updates the packet data structure with route information which it retrieves from the connection object. Next, the Firewall Module 60 retrieves the firewall action (i.e., drop/reject or accept) from the connection object. If the firewall action is 'drop/reject,' the Firewall Module 60 then determines if the action is 'drop.' If so, the Firewall Module 60 determines if the packet drop is to be logged. If so, the Firewall Module 60 logs the packet, and then drops it. If logging is not to be performed, the packet is dropped.

If the firewall action is 'accept,' the Firewall Module 60 passes the packet to the Management Module 70. The Management Module 70 is a computer-based module configured to perform the steps illustrated in FIG. 5 for all packets having an 'accept' firewall action, according to an embodiment of the present invention. According to an embodiment of the present invention, the Management Module 70 is configured to implement the one or more management policies associated with the connection object and packet. As used herein, the term management policy or policies is intended to include, but is not limited to the user-specific policy and the firewall rule related to the associated with a given connection object and the one or more packets governed by the connection object. The one or more management policies may include, but are not limited to, any suitable policy concerning the management and/or security of the connection, such as an application security policy (e.g., the IAP), the IDP, Network Address Translation policies (e.g., DNAT and SNAT), routing policies, and bandwidth classes or allocation policies. Accordingly, one having ordinary skill in the art will appreciate that the management policy relates to both the security and the management or handling of the connection and related packets.

Figure 5:
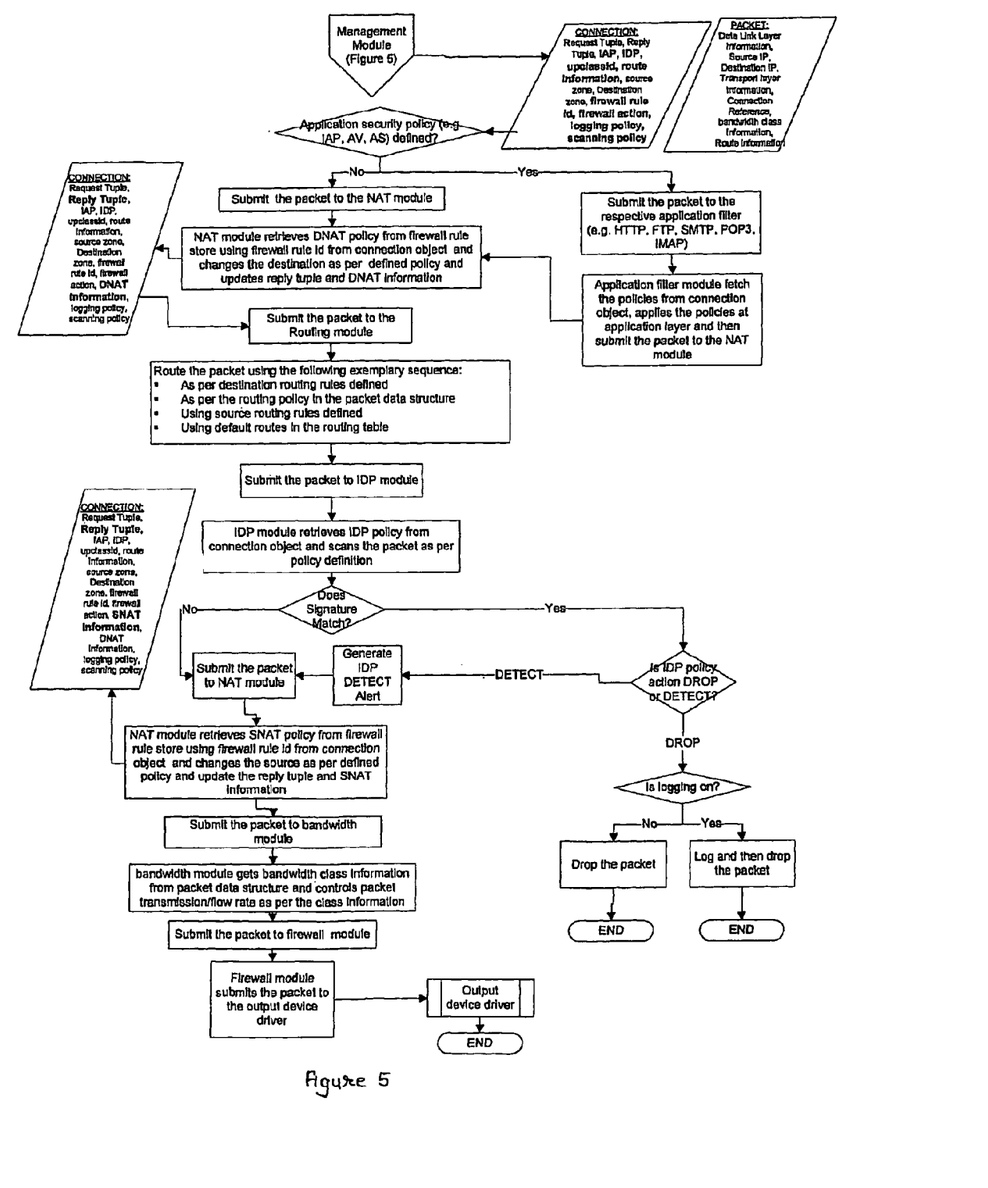
FIG. 5 illustrates a process flow of an exemplary Management Module, according to an embodiment of the present invention.

As illustrated in FIGS. 1 and 5, the Management Module 70 may comprise one or more sub-modules configured to implement the one or more management policies. In the example shown in FIGS. 1 and 5, the Management Module 70 comprises an Application Filter 71, a NAT Module 72, a Routing Module 73, an IDP Module 74, and a Bandwidth Module 75. One having ordinary skill in the art will appreciate that the Management Module 70 may have any number of suitable sub-modules, including any combination of the example sub-modules shown in FIG. 1. In addition, one having ordinary skill in the art will appreciate that additional sub-modules (not shown) configured to performed functions and tasks related to the management of a connection and packets may be included in the Management Module 70.

With reference to FIGS. 1 and 5, the Firewall Module 60 provides the connection object and packet to the first sub-module of the Management Module 70, here the Application Filter 71. The Application Filter 71 is a computer-based module configured to apply the one or more application security policies associated with the connection object. Exemplary application security policies which the Application Filter may execute include, but are not limited to, a IAP, an anti-virus policy, and an anti-spam policy.

Upon receipt of the connection object and packet, the Application Filter 71 submits the packet to the appropriate application filter (e.g., HTTP, FTP, SMTP, POP3, IMAP, etc.). In addition, the Application Filter 71 fetches any application security policies associated with the connection object, applies the policies at the application layer, and submits the packet to the next sub-module (if applicable).

According to an exemplary embodiment of the present invention, as shown in FIG. 5, the NAT Module 72 receives the packet and connection object, retrieves the Destination NAT (DNAT) policy from the Firewall Module 60 using the firewall rule identifying information stored in the connection object, changes the destination as per the defined DNAT policy, and updates the reply tuple and DNAT information in the connection object.

According to an exemplary embodiment of the present invention, the NAT Module 72 passes the packet to the Routing Module 73. The Routing Module 73 is a computer-based module configured to route the packet according to the one or more defined routing policies.

For example, if there are more than one defined routing policies, the Routing Module 73 may route the packet according to any suitable sequence or application of the policies. As shown in FIG. 5, the packet may be routed according to the following exemplary sequence: 1) per the destination routing policy, 2) per the routing policy in the packet data structure, 3) per source-defined routing rules, 4) per default routes set forth in a routing table. One having ordinary skill in the art will appreciate that the routing polices set forth in FIG. 5 and described above, and the suggested sequence, are exemplary in nature, and that other routing rules/policies and sequences may be applied in accordance with the present invention.

Next, the packet is submitted to the IDP Module 74. The IDP Module 74 is a computer-based module configured to retrieve the IDP policy from the connection object and scan the packet pursuant to the IDP policy. If the IDP Module 74 determines that there is no network traffic pattern signature match, the packet is submitted or passed to the next sub-module of the Management Module 70 (i.e., the NAT Module 72 in FIG. 5).

If the IDP Module 74 determines that the packet matches a network traffic pattern signature, the IDP Module 74 executes the appropriate IDP policy action (i.e., drop or detect). If the IDP policy action is 'drop,' the packet is dropped. Optionally, the packet may be logged prior to being dropped. If the IDP policy is 'detect,' the IDP Module 74 generates an alert and submits the packet to the next sub-module.

According to the exemplary embodiment illustrated in FIG. 5, the packet is received by the NAT Module 72, which is configured to retrieve the Source NAT (SNAT) policy, if applicable, from the Firewall Module 60 using the firewall rule identifier stored in the connection object. Next, the NAT Module 72 changes the source IP address as defined by the SNAT policy and updates the reply tuple and SNAT information of the connection object.

Next, in the example shown in FIG. 5, the Bandwidth Module 75 retrieves the bandwidth class information from the packet data structure and controls the transmission/flow rate of the packet based on the bandwidth class information.

Finally, once the packet has been reviewed by each of the sub-modules of the Management Module 70, it is passed back to the Firewall Module 60, where the packet is submitted to an output device driver for transmission to Destination 80.

It is to be understood that the exemplary embodiments and the above example are merely illustrative of the present invention and that many variations of the above-described embodiments and example can be devised by one skilled in the art without departing from the scope of the invention. It is therefore intended that all such variations be included within the scope of the invention.

What is claimed is:

1. A method comprising:
   receiving, by a computer, authenticated and authorized identity information associated with a user that includes at least a user id and one or more user IP addresses associated with the user id;
   receiving at least one data packet from a source, wherein the at least one packet comprises source information comprising a source IP address and destination information of a destination to which to transmit the packet;
   identifying, by the computer, a connection object associated with the connection based at least on the source information and the destination information of the at least one data packet;
   associating the identified connection object with the at least one packet;
   attempting to match the source IP address to one of the one or more user IP addresses;
   responsive to determining that the source IP address matches one of the one or more user IP addresses:
      identifying the identity information associated with the authorized user based on the source IP address;
      updating the identified connection object with the authenticated and authorized identity information;
      identifying a firewall rule associated with the at least one packet and the updated connection object based at least on a combination of the user id, the matched user IP address, the source information of the at least one data packet, and the destination information of the at least one data packet;
   applying the firewall rule to the at least one packet of the connection;
   performing a firewall action for the at least one packet in view of applying the firewall rule, wherein the action is selected from the group consisting of: accepting the at least one packet, dropping the at least one packet, or rejecting the at least one packet; and
   responsive to accepting the at least one packet after applying the firewall rule,
      identifying at least one management policy associated with the connection object;
      applying the at least one identified management policy to the at least one packet; and
      transmitting the at least one packet to the destination.

2. The method of claim 1, further comprising creating the connection object based at least in part on the source information and the destination information.

3. The method of claim 1, further comprising:
   receiving a login request from the user, wherein the login request comprises a user IP address, and login credentials;
   identifying a profile associated with the user, wherein the profile comprises user data and at least one user-specific policy;
   determining if the user is authentic by comparing the login credentials with the user data of the identified profile; and
   determining if the login request is authorized by applying the at least one user-specific policy of the identified profile.

4. The method of claim 3, wherein determining if the login request is authorized comprises applying a user-specific quota policy.

5. The method of claim 3, further comprising:
   applying override policy information to override at least a portion of the user-specific policy.

6. The method of claim 3, wherein determining if the login request is authorized comprises applying a user-specific access time policy.

7. The method of claim 1, wherein the at least one management policy comprises an application security policy.

8. The method of claim 1, wherein the at least one management policy comprises a destination network address translation policy.

9. The method of claim 1, wherein the at least one management policy comprises a source network address translation policy.

10. The method of claim 1, wherein the at least one management policy comprises a intrusion detection and prevention policy.

11. The method of claim 1, wherein the at least one management policy comprises a bandwidth management policy.

12. The method of claim 1, wherein the at least one management policy comprises a routing policy.

13. A system comprising a computer to:
receive authenticated and authorized identity information associated with a user that includes at least a user id and one or more user IP addresses associated with the user id;
receive at least one data packet from a source, wherein the at least one packet comprises source information comprising a source IP address and destination information of a destination to which to transmit the packet;
identify a connection object associated with the connection based at least on the source information and the destination information of the at least one data packet;
associate the identified connection object with the at least one packet;
attempt to match the source IP address to one of the one or more user IP addresses;
responsive to determining that the source IP address matches one of the one or more user IP addresses:
identify the identity information associated with the authorized user based on the source IP address;
update the identified connection object with the authenticated and authorized identity information;
identify a firewall rule associated with the at least one packet and the updated connection object based at least on a combination of the user id, the matched user IP address, the source information of the at least one data packet, and the destination information of the at least one data packet;
apply the firewall rule to the at least one packet of the connection;
perform a firewall action for the at least one packet in view of applying the firewall rule, wherein the action is selected from the group consisting of: accepting the at least one packet, dropping the at least one packet, or rejecting the at least one packet; and
responsive to accepting the at least one packet after applying the firewall rule,
identify at least one management policy associated with the connection object;
apply the at least one identified management policy to the at least one packet; and
transmit the at least one packet to the destination.

14. The system of claim 13, wherein the computer is further to create the connection object based at least in part on the source information and the destination information.

15. The system of claim 13, wherein the computer is further to:
receive a login request from the user, wherein the login request comprises a user IP address, and login credentials,
identify a profile associated with the user, wherein the profile comprises user data and at least one user-specific policy,
determine if the user is authentic by comparing the login credentials with the user data of the identified profile, and
determine if the login request is authorized by applying the at least one user-specific policy of the identified profile.

16. The system of claim 15, wherein the computer is further to determine if the login request is authorized by applying a user-specific quota policy.

17. The system of claim 15, wherein the computer is further to apply override policy information to override at least a portion of the user-specific policy.

18. The system of claim 15, wherein the computer is further to determine if the login request is authorized by applying a user-specific access time policy.

19. The system of claim 13, wherein the at least one management policy comprises an application security policy.

20. The system of claim 13, wherein the at least one management policy comprises a destination network address translation policy.

21. The system of claim 13, wherein the at least one management policy comprises a source network address translation policy.

22. The system of claim 13, wherein the at least one management policy comprises a intrusion detection and prevention policy.

23. The system of claim 13, wherein the at least one management policy comprises a bandwidth management policy.

24. The system of claim 13, wherein the at least one management policy comprises a routing policy.

* * * * *

UNITED STATES PATENT AND TRADEMARK OFFICE
CERTIFICATE OF CORRECTION

PATENT NO. : 8,984,620 B2  
APPLICATION NO. : 11/915607  
DATED : March 17, 2015  
INVENTOR(S) : Sonwane et al.

It is certified that error appears in the above-identified patent and that said Letters Patent is hereby corrected as shown below:

On the Title Page, item (75), Column 1, under "Inventors," Line 2, delete "Hareshkumau" and insert -- Hareshkumar --.

In the Claims:
In Column 11, Line 13, Claim 10, delete "a intrusion" and insert -- an intrusion --.

In Column 12, Line 45, Claim 22, delete "a intrusion" and insert -- an intrusion --.

Signed and Sealed this
Eleventh Day of August, 2015

Michelle K. Lee
*Director of the United States Patent and Trademark Office*